United States Patent
Doddavula et al.

(10) Patent No.: US 9,418,391 B2
(45) Date of Patent: Aug. 16, 2016

(54) SYSTEM FOR INFLUENCER SCORING AND METHODS THEREOF

(71) Applicant: Infosys Limited, Bangalore (IN)

(72) Inventors: Shyam Kumar Doddavula, Bangalore (IN); Karol Daniel, Lublin (PL)

(73) Assignee: Infosys Limited, Bangalore (IN)

( * ) Notice: Subject to any disclaimer, the term of this patent is extended or adjusted under 35 U.S.C. 154(b) by 238 days.

(21) Appl. No.: 14/220,495

(22) Filed: Mar. 20, 2014

(65) Prior Publication Data

US 2014/0379702 A1    Dec. 25, 2014

(30) Foreign Application Priority Data

Jun. 24, 2013    (IN) .......................... 2731/CHE/2013

(51) Int. Cl.
*G06F 17/30*    (2006.01)
*G06Q 50/00*    (2012.01)

(52) U.S. Cl.
CPC .......... *G06Q 50/01* (2013.01); *G06F 17/30867* (2013.01)

(58) Field of Classification Search
None
See application file for complete search history.

(56) References Cited

U.S. PATENT DOCUMENTS

| | | | |
|---|---|---|---|
| 7,865,551 B2 | 1/2011 | McCuller | |
| 7,933,843 B1 | 4/2011 | von Groll et al. | |
| 2005/0256866 A1* | 11/2005 | Lu | G06F 17/30867 |
| 2008/0005064 A1* | 1/2008 | Sarukkai | G06F 17/241 |
| 2008/0070209 A1 | 3/2008 | Zhuang et al. | |
| 2008/0140506 A1 | 6/2008 | Christianson et al. | |
| 2008/0147487 A1* | 6/2008 | Hirshberg | G06Q 30/02 705/14.53 |
| 2009/0048904 A1 | 2/2009 | Newton et al. | |
| 2009/0063254 A1 | 3/2009 | Paul et al. | |
| 2009/0119173 A1 | 5/2009 | Parsons et al. | |
| 2009/0281851 A1 | 11/2009 | Newton et al. | |
| 2010/0070485 A1 | 3/2010 | Parsons et al. | |
| 2011/0040760 A1* | 2/2011 | Fleischman | G06Q 30/02 707/737 |
| 2011/0093520 A1 | 4/2011 | Doyle et al. | |
| 2014/0040281 A1* | 2/2014 | Spivack | H04L 51/32 707/748 |

OTHER PUBLICATIONS

Freshminds., "Social media monitoring tools, mummy bloggers & organic baby food", Freshminds, 2014, pp. 1-2, <www.freshminds.net>.

* cited by examiner

*Primary Examiner* — Wilson Lee
(74) *Attorney, Agent, or Firm* — LeClairRyan, a Professional Corporation (57) ABSTRACT

Systems and methods for leveraging social media data by entities to identify key influencers are disclosed. Monitoring criteria is based on a selected subject-matter. The analysis permits quantification of influencers and takes into account the conversari platforms and the published platforms in the social media.

18 Claims, 3 Drawing Sheets

FIGURE 1
(PRIOR-ART)

SYSTEM FOR INFLUENCER SCORING AND METHODS THEREOF

This application claims the benefit of Indian Patent Application Filing Number 2731CHE/2013, filed on Jun. 24, 2013, which is hereby incorporated by reference in its entirety.

FIELD

The present disclosure relates in general to the field of computer networks, and more particularly, to a system and methods for use with social media platforms to determine at least one influencer.

BACKGROUND

Social media is one the fastest-growing segment. The term 'social media', as used herein, means a way to transmit or share information with a larger audience. One of the popular channels of social media is social networks, which are platforms to engage, interact, communicate and collaborate with users. The term 'social network', as used herein, means web-based services that allow members to construct a public or a semi-public profile within the boundary of that particular community. Social networks provide a facility to consolidate a list of other members with whom a member may want to share a connection.

Social media channels provide platforms to express opinions and share ideas about companies or products, which make social media of utmost importance in corporate communications, public relations and advertising campaigns. This property of Social media, and, in turn, social networks, to engage a large number of members as potential content generators yields massive source of information. Hence, businesses require solutions to monitor the social media for a member's opinion towards their brands as well as to increase their brand recognition and influence opinions. For example, current guidelines do not mandate any stringent application level security other than encryption of the transmission media. Accordingly, HTTS based interfaces between a hand-held computing device and in-store server components are merely designed to ensure that card data is secure during transmission. As a result, with these new types of POS emerging, higher levels of security to protect this sensitive transaction POS data are needed.

In order to influence a member's opinion, companies look to identify the key influencers. The term 'influencer', as used herein, means a member who transmits information, through social media channels, that have an impact on other member's ideas and practices. Members of the social media who get the most attention may be considered as influencers for a particular topic on a social media channel. These members have the power to affect other member's opinions, and thus their perception of the brand and purchase decisions. Influence is dynamic and depends on variety of factors for example, perceived authority and audiences reach. Influential zones can be found across social media, for example, Facebook®, Twitter®, blogs and forums by applying social network analysis technics.

There exist several methodologies for identifying influencers. Trusov, Bodapati et al describe how to identify influencers, given member's behavior among his network of friends. The approach proposes a non-standard form of Bayesian shrinkage implemented in a Poisson regression. Instead of shrinking across panelists, strength is pooled across variables within the model for each member. The approach identifies the specific members who most influence others' activity. Cha, Haddadi, Benevenuto, Gummad et al describe how to measure member influence in Twitter® by comparing three measures: 1) indegree influence, the number of followers of a member, directly indicates the size of the audience for that user 2) retweet influence, measured through the number of retweets containing one's name, indicates the ability of that member to generate content, 3) mention influence, measured through the number of mentions containing one's name, indicates the ability of that member to engage others in a conversation. This approach examines how the influential members perform in spreading popular news topics by investigating the dynamics of an individual's influence by topic and over time and characterizing the precise behaviors that make ordinary individuals gain high influence over a short period of time. Wu, Hofman, Mason, Watts et al describe a method for analysis of 'lists' feature of Twitter® to distinguish between elite members and ordinary members to different news topics. This solution examines attention on Twitter® paid by the different member categories to different news topics. Bakshy, Hofman, Mason, Watts et al describe investigation of the attributes and relative influence of Twitter® members by tracking diffusion events. This approach tries to identify influencers by: 1) determining members who have been influential in the past and who have a large number of followers, 2) finding web-links that were rated interesting. Weng, Lim, Jiang, He et al describe analyzing impact of member's followers and persons that member follows. TwitterRank, an extension of PageRank is used to identify influencers taking the link structure and topical similarity between members into consideration. The underlying assumption of this approach is homophily between members, which mean that twitterers follow other members because of the topical similarity between them and their friends. Agarwal, Liu, Tang, Yu et al describe a method for determining influential bloggers based on analyzing bloggers properties: recognition i.e. number of in-links, activity generation i.e. number of comments, novelty i.e. number of out-links and eloquence i.e. length of post. Moon, Han et al describe a quantitative method for identifying influential bloggers by weighting readers based on homophily and vulnerability with bloggers. This approach is based on the Quantifying Influence Model (QIM), which includes two components: 1) interpersonal similarity, which presents the interaction among bloggers and interpersonal similarity between readers 2) degree of information propagation, which represents how many readers a blogger has, where the readers diffuse the blog posts.

The above-mentioned methodologies describe different methods of analyzing social media channels, particularly, conversations in social networks. For the purposes of this disclosure, the social media channel, particularly, social network conversations are referred to as 'Conversari Platform'. These methods focus on social networks and do not take into account other social media channels, for example, but not limited to, product launches, product evangelizations, conference presentations, content platforms, product recommendations and research papers. This may lead to inaccurate identification of influencers and their estimated influence. For the purposes of this disclosure, this category of social media channels is referred to as 'Published Platform'.

There lies a need to ascertain scores of influencers by taking into account the 'Published Platform in addition to the 'Conversari Platform'. The present disclosure improves the accuracy of identifying influencers and quantifying their influence by taking into account the 'Published Platform'.

SUMMARY

Aspects of the disclosure relate to a system and method for identifying key influencers in various social media platforms.

It is therefore an object of the present disclosure to provide systems and methods for arriving at one or more effective influencers and quantifying their influence in the social media by taking into the 'conversari platform' and the 'published platform'.

It is another object of the present disclosure to provide systems and methods for automation of the determinations of the events and information associated with the key influencers.

The above as well as additional aspects and advantages of the disclosure will become apparent in the following detailed written description

BRIEF DESCRIPTION OF THE DRAWINGS

The aspects of the disclosure will be better understood with the accompanying drawings.

While systems and methods are described herein by way of example and embodiments, those skilled in the art recognize that systems and methods disclosed herein are not limited to the embodiments or drawings described. It should be understood that the drawings and description are not intended to be limiting to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to) rather than the mandatory sense (i.e., meaning must). Similarly, the words "include", "including", and "includes" mean including, but not limited to.

DETAILED DESCRIPTION

Disclosed embodiments provide computer-implemented methods, systems, and computer-readable media for leveraging social media platforms to arrive at one or more effective influencers. The embodiments described herein are related to identification of influencers by the combined influence of 'conversari platform' and 'published platform'. While the particular embodiments described herein may illustrate the invention in a particular domain, the broad principles behind these embodiments could be applied in other fields of endeavor. To facilitate a clear understanding of the present disclosure, illustrative examples are provided herein which describe certain aspects of the disclosure. However, it is to be appreciated that these illustrations are not meant to limit the scope of the disclosure, and are provided herein to illustrate certain concepts associated with the disclosure.

It is also to be understood that the present disclosure may be implemented in various forms of hardware, software, firmware, special purpose processors, or a combination thereof. Preferably, the present invention is implemented in software as a program tangibly embodied on a program storage device. The program may be uploaded to, and executed by, a machine comprising any suitable architecture.

Figure 1:
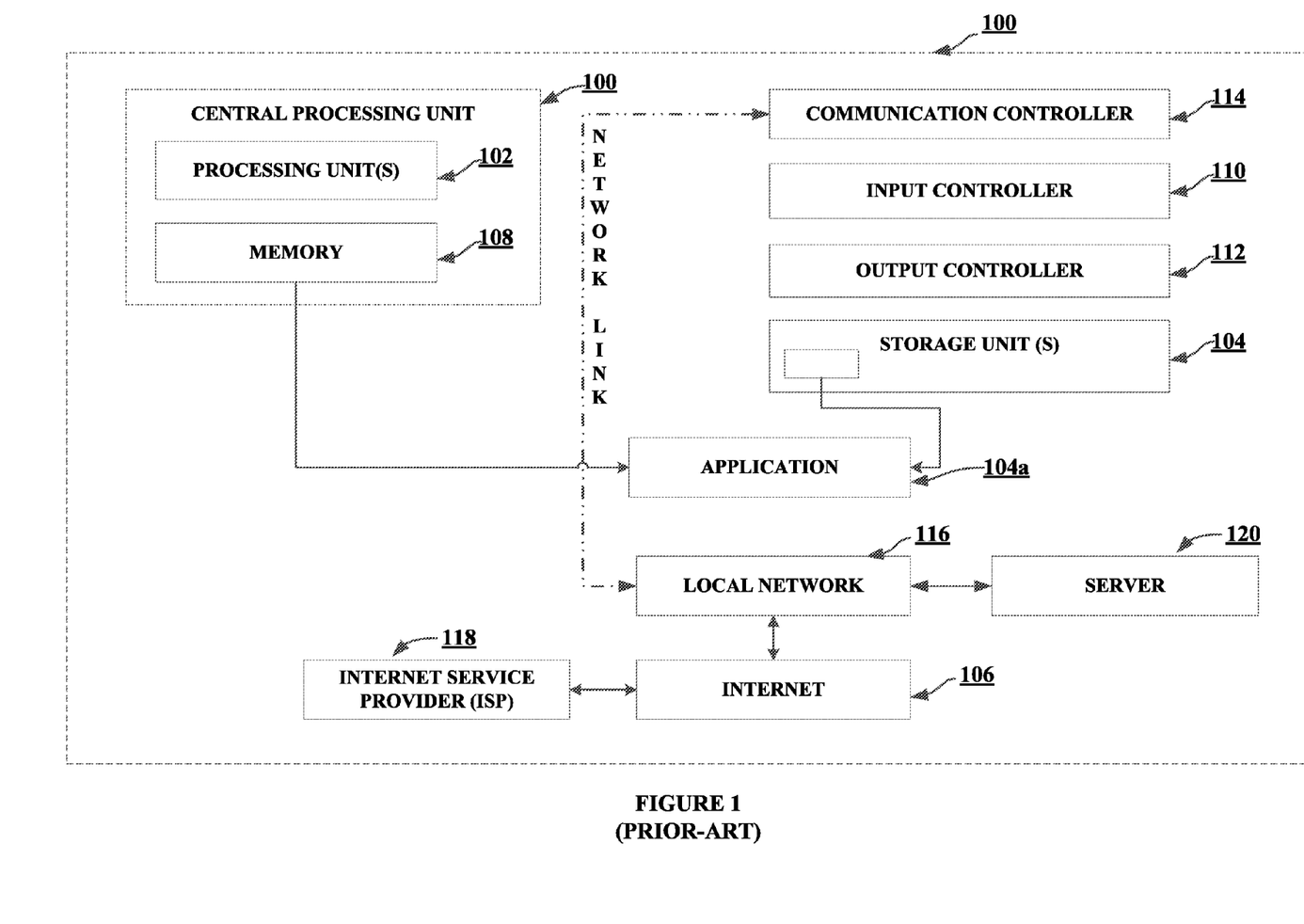
FIG. 1 is an illustration of a prior art.

FIG. 1 (PRIOR-ART) is a block diagram of a computing device 100 to which the present disclosure may be applied according to an embodiment of the present disclosure. The system includes at least one processor 102, designed to process instructions, for example computer readable instructions (i.e., code) stored on a storage device 104. By processing instructions, processing device 102 may perform the steps and functions disclosed herein. Storage device 104 may be any type of storage device, for example, but not limited to an optical storage device, a magnetic storage device, a solid state storage device and a non-transitory storage device. The storage device 104 may contain an application 104a which is a set of instructions (i.e. code). Alternatively, instructions may be stored in one or more remote storage devices, for example storage devices accessed over a network or the internet 106. The computing device also includes an operating system and microinstruction code. The various processes and functions described herein may either be part of the microinstruction code or part of the program (or combination thereof) which is executed via the operating system. Computing device 100 additionally may have memory 108, an input controller 110, and an output controller 112 and communication controller 114. A bus (not shown) may operatively couple components of computing device 100, including processor 102, memory 108, storage device 104, input controller 110 output controller 112, and any other devices (e.g., network controllers, sound controllers, etc.). Output controller 110 may be operatively coupled (e.g., via a wired or wireless connection) to a display device (e.g., a monitor, television, mobile device screen, touch-display, etc.) in such a fashion that output controller 110 can transform the display on display device (e.g., in response to modules executed). Input controller 108 may be operatively coupled (e.g., via a wired or wireless connection) to input device (e.g., mouse, keyboard, touch-pad, scroll-ball, touch-display, etc.) in such a fashion that input can be received from a user. The communication controller 114 is coupled to a bus (not shown) and provides a two-way coupling through a network link to the internet 106 that is connected to a local network 116 and operated by an internet service provider (hereinafter referred to as 'ISP') 118 which provides data communication services to the internet. Members or subscribers of social media may be connected to the local network 116. A network link typically provides data communication through one or more networks to other data devices. For example, network link may provide a connection through local network 116 to a host computer, to data equipment operated by an ISP 118. A server 120 may transmit a requested code for an application through internet 106, ISP 118, local network 116 and communication controller 114. Of course, FIG. 1 illustrates computing device 100 with all components as separate devices for ease of identification only. Each of the components may be separate devices (e.g., a personal computer connected by wires to a monitor and mouse), may be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Computing device 100 may be one or more servers, for example a farm of networked servers, a clustered server environment, or a cloud network of computing devices.

The disclosure provides for systems and methods for identifying key influencers from the 'published platforms' for different domains and analyzes these events along with the 'conversari platform' to arrive at a more effective result of identifying influencers and their social media influence.

In various exemplary embodiments, an application 104a or service, typically operating on a host site (for example, a website) to facilitate social media platform management and influence scoring for a member at a platform. The platform may be a 'published platform' or a 'conversari platform'.

Each type of platform provides for a plurality of content channels of which a user may become a member. A member can provide by use of a data processor, a user interface to enable a member to specify one or channels of interest in the 'published platform' and the 'conversari platform'. The user interface can further enable a member to provide authentication credentials for each platform channel of interest. The authentication credentials can be used to automatically collect platform channel data from each of the plurality of platforms of interest, the channel data including channels from 'published platform' and the 'conversari platform'. As with any of the content sources, published platform can include a data storage device or a depository of content, with one or more servers to serve that content to users at the user platform via network. The identities and data associated with members who have subscribed to a particular channel and data associated with the particular content on that channel can be collected once the user of the user platform provides an authentication.

Content may be collected for each of the plurality of channels of interest from the 'published platform' and the 'conversari platform' using content access mechanisms, including, but not limited to, a push mechanism, a pull mechanism, a download mechanism and the like. Examples of 'published platform' include domains for example, but not limited to, science and technology, entertainment, sports, health and the like. Science and technology may include academics related channels, for example, IEEE, Google Scholar, Microsoft Academic Research and the like. Science and technology may also include industry related channels, for example, slideshare, techcrunch, techmeme and the like. Entertainment industry may include movies related channels with information pertaining to earnings, number and type of theatres, television rating points and the like. Entertainment industry may also include music related channels with information pertaining to salaries, rankings of albums sold and the like. Sports may include salaries of sports starts, rankings based on competition results. Health may include doctor ratings, blogs on veterinary doctor's advices. 'Published platform' may also include product launches, product evangelizations, conference presentations, content platforms, product recommendations and research papers and the like. Content, in addition to including social interactions, may also include alterations made by a member to their own social content. 'Conversari platforms' represent one or more social networks that provide a platform for social interactions between members of each of the 'conversari platforms'. A social interaction between two members may take many forms in the social network. For example, a social interaction may be a comment left on a 'conversari platform' channel by another member. A social interaction may also include a link to another member's site. Social interactions may further be created by a member when he creates a list of other members and becomes a potential viewer to their website.

Figure 2:
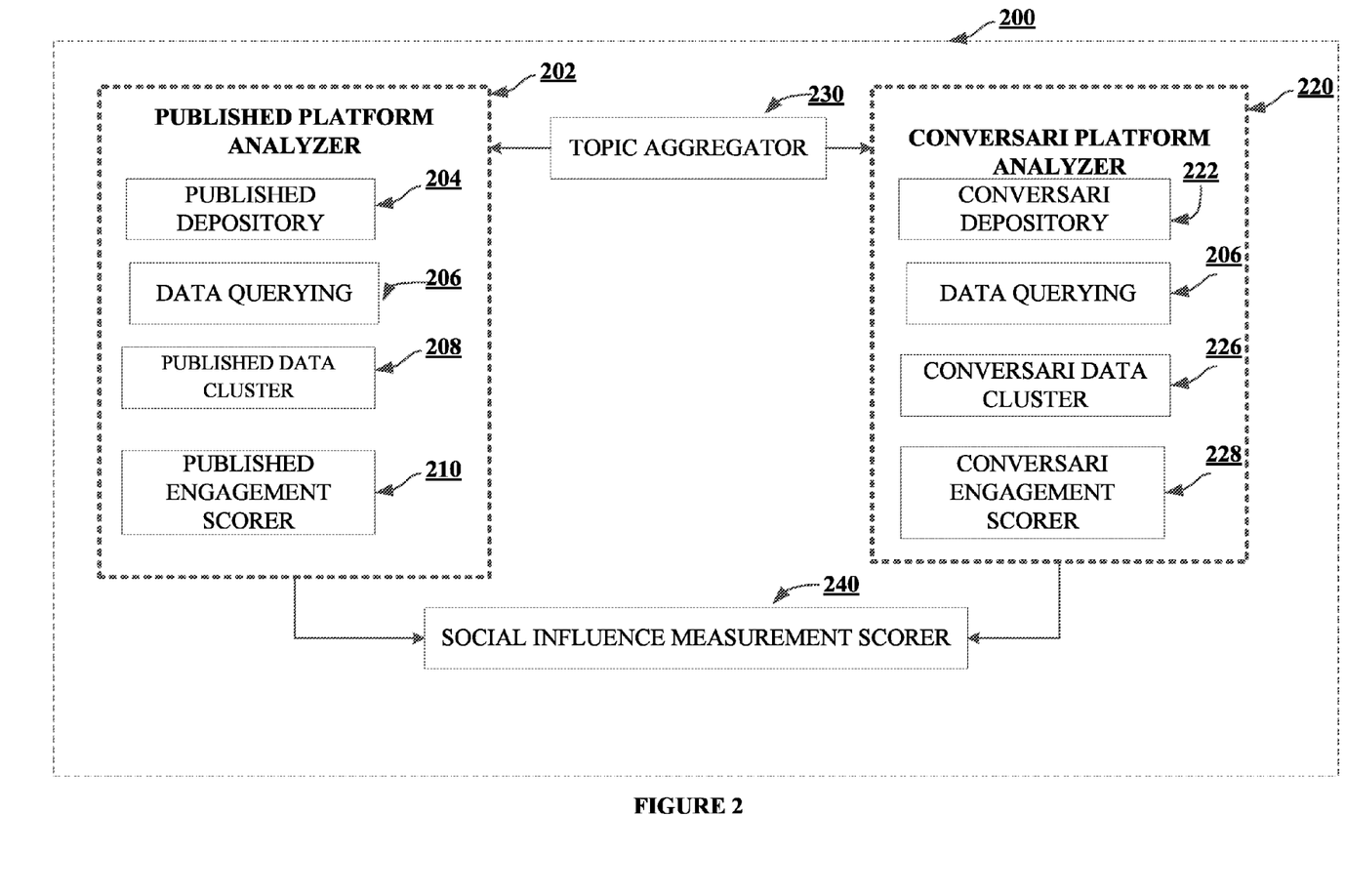
FIG. 2 shows a schematic block diagram to illustrate system for identifying key influencers in accordance with the present disclosure.

FIG. 2 illustrates a system 200 to which the embodiments of the present can be applied. A Published Platform Channel Analyzer (hereinafter may be referred to as 'PPCA Analyzer') 202 analyze content from social media channels, other than social networking channels. A Conversari Platform Channel Analyzer (hereinafter may be referred to as 'CPCA Analyzer') 220 gather and identify data from social networking channels. A Topic Aggregator 230 receives input in the form of data sets. The data set comprises of at least one selected topic for which the system needs to determine at least one influencer. Examples of topic include, but are not limited to, cloud computing, open source software, product launch and a company. A published depository 204 and a conversari depository 222 can be respectively pre-configured for various channels of 'published platforms' and 'conversati platforms'. The published depository 204 and conversari depository 222 receive data sets in the form of selected topics or subject-matter of choice from the topic aggregator 230. Data is captured from the pre-configured channels in the published depository 204 by a data querying module 206 and analyzed by a published data cluster 208. Similarly, the conversari data cluster 226 analyzes the data captured by the data querying module 206 for pre-configured channels in the conversari depository 222. The system may be configured to query the social media platforms, specifically, the published platform channels and the conversari platform channels about the selected topic by including one more keywords indicative of the topic or domain. More specifically, for each content type from a platform channel, meta-data or information describing the content is identified. For example, for a paper publication, the metadata may include information such as a publisher, authors, year of publication, number of references and the like. This data may be a measurement of the number of page views on the social content of the 'conversari platforms' and the 'published platforms'. Data captured from the respective depositories is analyzed for various influence metrics. Analysis on one or more metrics may be based on the pre-assigned weightages to quantify the relative importance of an event or influencer. According to an embodiment of the present disclosure, metrics may include, but is not limited to, activity, authority and audience. Other metrics may include resonance, velocity and content types. The term, activity, as used herein, means the volume or quantity of information shared between members. The term, authority, as used herein, means the quantitative measure of trust on the content generated by a member. The term, audience, as used herein, means the size of members that actively listens and reacts to a members' content. For example, the system may be pre-configured for published platforms such as SlideShare based on metrics such as activity, authority and audience. The activity in published platforms may relate to the number of files or documents uploaded on SlideShare. Authority may relate to the total number of views of documents uploaded by a member or the quantitative measure of trust. Audience metric may relate to the size of members that actively listens and reacts to members' generated content in terms of number of followers, number of documents and number of times documents were added to members' favorites. The activity in conversari platforms may relate to aggregated mentions across the respective conversari platform, for example, total number of posts, comments or links. Authority may relate to acknowledgement by a member who is an authority on the selected topic or domain, for example, number of members who reposted the content and uniqueness of content. Audience metric may relate to the size of the members who are responsive to the content generated by the prospective influencer, for example, number of followers, number of other members added to the list of the prospective influencer, and follower versus following ratio. Another metric that may be utilized by the social influence measurement module is incoming message data. This data may also include the influence measurement, if available, of the members sending the messages to the conversari platforms and published platforms. Thus if a member is receiving messages from more influential members within the platforms, the member may carry a degree of influence within the community. A member that adds new content to his website frequently will generally receive a higher value than a member that updates only periodically. According to an embodiment of this disclosure, the system may be configured to detect members 202 who attempt to generate in increased value by spamming or by generating some other form of content with no value.

While the scoring criteria may or may not be the same for the 'conversari platform' and the 'published platform', the weights for the scoring criteria may be assigned separately for each platform. The published depository 204 and the conversari depository 222 may be further pre-configured to assign weightages for various content types and/or channels. For example, associated content type in published platforms include but is not limited to paper publications, case studies, product launches, product evangelizations and roadshows (table 1). As used herein, content may be referred to as member-generated content. For the purposes of this disclosure, the term content, as used herein, may be used interchangeably with social content. Various types of contents may be available on various published platform channels, for example, SlideShare. The system can be pre-configured to assign weightages for determining the degree of influence and the related events. Social content may take the form of text, graphics, video, or any other electronic form. Social content may also be presented in the form of a blog, an online journal, an e-mail message.aphotograph.an illustration, a sound file, a video file, or some other combination of electronic content.

TABLE 1

| Published Platforms Content Type | Pre-Configured Weights |
|---|---|
| Paper publication (for example, research paper) | 0.2 |
| Case study | 0.1 |
| Product launch | 0.3 |
| Product evangelization | 0.3 |
| Road shows | 0.1 |

A published engagement scorer 210 and a conversari engagement scorer 228 can identify influencers in 'published platforms' and 'conversari platforms' respectively based on one or more metrics. The term, score, as used herein refers, to a numerical value. While a score is referred herein to a numerical value, it may also refer to any type of indicator signifying a degree of relevance of the content from a channel of a published platform and/or conversari platform. The degree of relevance may be the degree of similarity between a particular content based on pre-configured preferences of the user. Preferably, the scoring criterion is pre-configured by the user. Alternatively, the scoring module may be default configuration of the system or system defined. For example, the scoring criterion may include pre-defined weightages for different influence metrics and the published engagement scorer 210 and conversari engagement scorer 226 operate to score the influencers based on these pre-defined weightages of metrics and pre-defined weightages of content types in published depository 204 and conversari depository 222. The weight generation operates to programmatically assign the weights to the scoring criteria for each of metrics. More specifically, for each member, the weight generation operates to assign the weights to the scoring criteria for that member based on an analysis of a group of content types associated with that member. The published engagement scorer 210 calculates an influence score in the 'published platform' by assigning weights to each of the identified metrics, for instance, activity, authority and audience. The published engagement scorer 210 determines the influencer in published platforms through an additive function that determines the combined value of associated events. Using equation I, conversari engagement scorer 226 may be calculated:

$$(W_a*\text{Authority}) + (W_{ad}*\text{Audience}) + (W_{ac}*\text{Activity}) \quad \text{[Equation I]}$$

Similarly, the conversari engagement scorer 226 is calculated by assigning weights to each of the identified metrics, for instance, activity, authority and audience. Weights are assigned to various metrics and score may be calculated using equation II:

$$(W_a*\text{Authority}) + (W_{ad}*\text{Audience}) + (W_{ac}*\text{Activity}) \quad \text{[Equation II]}$$

The final ranking may be done by a social influence measurement scorer 240. Influence scores from 'published platform' and 'conversari platforms' may be combined to arrive at a score that describes the degree of influence using equation III:

$$(W_{ed}*\text{Event Driven Influencer Score}) + (W_{cd}*\text{Content Driven Influencer Score}) \quad \text{[Equation III]}$$

Figure 3:
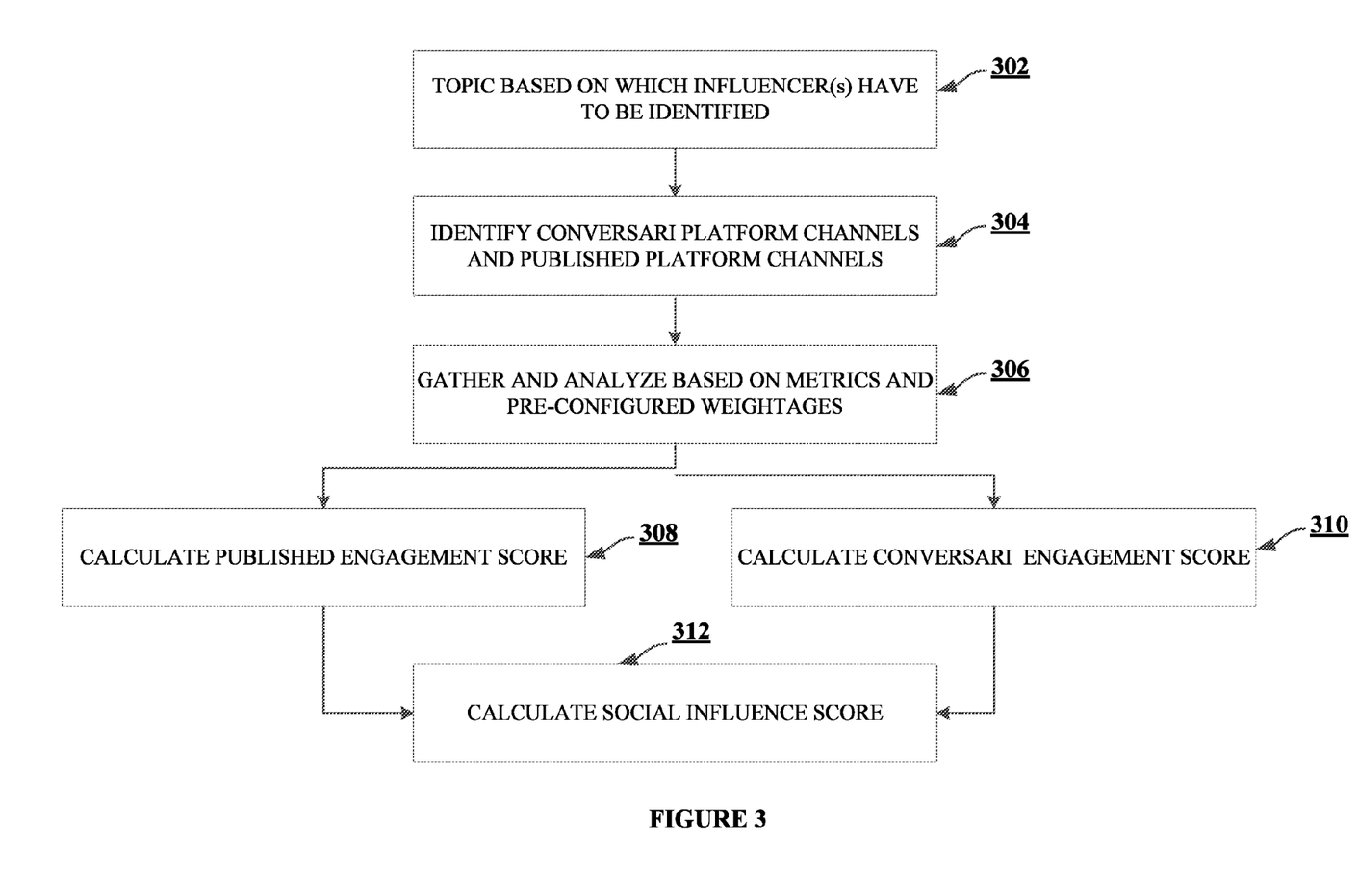
FIG. 3 is a flow diagram showing steps typically performed to identify key influencers.

FIG. 3 is a flow diagram showing steps typically performed to identify key influencers. The topic or domain for which influencers have to be identified is provided by a user 302. In one example, influencers, influencers were identified for cloud computing domain. Pre-configured 'published platform' channels and 'conversari platform' channels are identified 304 through the published depository 204 and conversari depository 222 respectively. Data was captured from the pre-configured platform channels 306. Using Equation I, the published engagement scorer 210 determined the published engagement score 310 and ranked the top ten influencers (table 2).

TABLE 2

| Ranking | Company | Name | Content-driven influencer score |
|---|---|---|---|
| 1 | Amazon WS | Werner Vogels | 80 |
| 2 | Enomaly | Reuven Cohen | 78 |
| 3 | GoGrid | Michael Sheehan | 60 |
| 4 | Amazon WS | Jeff Ban | 54 |
| 5 | Cloudscaling | Randy Bias | 41 |
| 6 | EngineYard | Ezra Zygmuntowicz | 41 |
| 7 | Cisco | James Urquhart | 37 |
| 8 | Google | Patrick Chanezon | 33 |
| 9 | RightScale | Josh Fraser | 32 |
| 10 | CohesiveFT | Yan Pritzker | 32 |

Similarly, the conversari data cluster 226 determined the conversari engagement score 310 and ranked the top ten influencers from the pre-configured channels in the conversari depository 222. Using Equation II, the conversari engagement scorer 228 determined the top ten influencers (table 3).

TABLE 3

| Ranking | Company | Name | Event-driven influencer score |
|---|---|---|---|
| 1 | Google | Chris Schalk | 42 |
| 2 | Netflix | Adrian Cockroft | 43 |
| 3 | Google | Patrick Chanezon | 31 |
| 4 | Amazon WS | Jinesh Varia | 24 |
| 5 | Oracle | Rex Wang | 20 |
| 6 | Amazon WS | Werner Vogels | 20 |
| 7 | Amazon WS | Simone Brunozzi | 18 |
| 8 | EngineYard | Ezra Zygmuntowicz | 16 |
| 9 | OpenStack | Bret Piatt | 13 |
| 10 | Cloudscaling | Randy Bias | 9 |

Using Equation III, the social influencer measurement scorer 240 calculated the social influence score 312 and derived the top ten influencers in the social media, which included 'conversari platform' and 'published platform' (table 4).

TABLE 4

| Company | Name of Influencer | Conversari Platform Score | Published Platform Score | Social Influence Measurement Score | Ranking |
|---|---|---|---|---|---|
| Amazon WS | Matt Tavis | 9 | — | — | |
| GoGrid | John Keagy | 5 | — | — | |
| GoGrid | Rob Larson | 4 | — | — | |
| Amazon WS | Werner Vogels | 20 | 80 | 44 | 1 |
| Google | Chris Schalk | 42 | 30 | 37 | 2 |
| Enomaly | Reuven Cohen | 4 | 78 | 33 | 3 |
| Google | Patrick Chanezon | 31 | 33 | 32 | 4 |
| Netflix | Adrian Cockroft | 43 | 10 | 30 | 5 |
| GoGrid | Michael Sheehan | 8 | 60 | 29 | 6 |
| Amazon WS | Jeff Barr | 8 | 54 | 27 | 7 |
| EngineYard | Ezra Zygmuntowicz | 16 | 41 | 26 | 8 |
| Amazon WS | Jinesh Varia | 24 | 22 | 23 | 9 |
| Oracle | Rex Wang | 20 | 27 | 23 | 10 |
| Cloudscaling | Randy Bias | 9 | 41 | 22 | |
| Amazon WS | Simone Brunozzi | 18 | 26 | 21 | |
| Cisco | James Urquhart | 8 | 37 | 19 | |
| OpenStack | Bret Piatt | 13 | 25 | 18 | |
| Netflix | Kevin McEntee | 5 | 30 | 15 | |
| Appistry | Sam Charrington | 8 | 25 | 15 | |
| CohesiveFT | Yan Pritzker | 3 | 32 | 14 | |
| Dell | Barton George | 5 | 29 | 14 | |
| RightScale | Josh Fraser | 2 | 32 | 14 | |
| EngineYard | Wesley Beary | 3 | 30 | 14 | |
| VMWare | Dave McCrory | 3 | 28 | 13 | |
| EngineYard | Tom Mornini | 1 | 31 | 13 | |
| Eucalyptus | Marten Mickos | 1 | 30 | 13 | |
| Joyent | Scott Herson | 2 | 28 | 13 | |
| Cloudera | Jeff Hammerbacher | 5 | 23 | 12 | |
| VMWare | Derek Collison | 8 | 17 | 12 | |
| CohesiveFT | Ryan Koop | 3 | 23 | 11 | |
| Rackspace | Graham Weston | 1 | 25 | 11 | |
| Citrix | Michael Harries | 5 | 18 | 10 | |
| Rackspace | John Engates | 2 | 21 | 10 | |
| GoGrid | Paul Lancaster | 2 | 22 | 10 | |
| Eucalyptus | Rich Wolski | 3 | 18 | 9 | |
| Rackspace | Erik Carlin | 1 | 18 | 8 | |
| OpenStack | Stephen Spector | 2 | 14 | 7 | |
| Novell | Ben Goodmann | 4 | 9 | 6 | |
| RightScale | Michael Crandell | 2 | 10 | 5 | |
| Rackspace | Andy Schroepfer | 3 | 3 | 3 | |

According to an embodiment of the present disclosure, weightages may be tuned at various staged based on the estimated influence scores and the actual influence metrics. According to another embodiment of the present disclosure, influence score may be measured over periodic intervals. The estimated influence score and be compared with the actual influence score and based on this the weightages may be tuned at various stages based on the estimated influence scores and the actual influence metrics.

Having described and illustrated the principles of the disclosure with reference to described embodiments and accompanying drawings, it will be recognized by a person skilled in the art that the described embodiments may be modified in arrangement without departing from the principles described herein. Although the disclosure has been described in connection with specific preferred embodiments, it should be understood that the disclosure as claimed should not be unduly limited to such specific embodiments.

What is claimed is:

1. A method for deriving at least one influencer, the method comprising:
   receiving, by an opinion management computing device, a data set comprising at least one selected topic;
   performing, by the opinion management computing device, a first keyword search for the selected topic, using a first keyword search query in at least one published platform channel, the first keyword search query containing keywords to identify a first meta-data of the at least one selected topic;
   performing, by the opinion management computing device, a second keyword search in at least one conversari platform channel the second keyword search query containing keywords to identify a second meta-data of the at least one selected topic;
   categorizing, by the opinion management computing device, the first meta-data and the second meta-data based on at least one metric;
   calculating, by the opinion management computing device, a social influence measurement score by applying a linear combination with pre-configured weightages for the at least one metric; and designating, by the opinion management computing device, a first ranked entity as an influencer for the selected topic, wherein the ranking is determined based on the social influence measurement score.

2. The method according to claim 1, wherein the first meta-data is identified based on pre-configured weightage for each of a plurality of content categories.

3. The method according to claim 1, wherein the metric comprises:
   a first audience metric and a second audience metric, wherein the first audience metric is associated with the first meta-data and the second audience metric is associated with the second meta-data;
   a first authority metric and a second authority metric, wherein the first authority metric is associated with the first meta-data and the second authority metric is associated with the second meta-data; and
   a first activity metric and a second activity metric, wherein the first activity metric is associated with the first meta-data and the second activity metric is associated with the second meta-data.

4. The method of claim 3 further comprising calculating by the opinion management computing device a published engagement score by applying a linear algorithm with pre-configured weightages for each of the metrics associated with the first meta-data.

5. The method of claim 3 further comprising calculating by the opinion management computing device a conversari engagement score by applying a linear algorithm with pre-configured weightages for each of the metrics associated with the second meta-data.

6. The method in accordance with claim 1, wherein the entity comprises at least one or more of a web entity, a partnership, a disparate group, a business, a group of individuals, or an individual.

7. An opinion management computing device comprising:
   a processor;
   a memory, wherein the memory coupled to the one or more processors which are configured to execute programmed instructions stored in the memory comprising:
   receiving a data set comprising at least one selected topic;
   performing a first keyword search for the selected topic, using a first keyword search query in at least one published platform channel, the first keyword search query containing keywords to identify a first meta-data of the at least one selected topic;
   performing a second keyword search in at least one conversari platform channel the second keyword search query containing keywords to identify a second meta-data of the at least one selected topic;
   categorizing the first meta-data and the second meta-data based on at least one metric;
   calculating a social influence measurement score by applying a linear combination with pre-configured weightages for the at least one metric; and
   designating a first ranked entity as an influencer for the selected topic, wherein the ranking is determined based on the social influence measurement score.

8. The device in accordance with claim 7, wherein the first meta-data is identified based on pre-configured weightage for each of a plurality of content categories.

9. The device in accordance with claim 7, wherein the metric comprises:
   a first audience metric and a second audience metric, wherein the first audience metric is associated with the first meta-data and the second audience metric is associated with the second meta-data;
   a first authority metric and a second authority metric, wherein the first authority metric is associated with the first meta-data and the second authority metric is associated with the second meta-data; and
   a first activity metric and a second activity metric, wherein the first activity metric is associated with the first meta-data and the second activity metric is associated with the second meta-data.

10. The device in accordance with claim 9, further comprising calculating a published engagement score by applying a linear algorithm with pre-configured weightages for each of the metrics associated with the first meta-data.

11. The device in accordance with claim 9, further comprising calculating a conversari engagement score by applying a linear algorithm with pre-configured weightages for each of the metrics associated with the second meta-data.

12. The device in accordance with claim 7, wherein the entity comprises at least one or more of a web entity, a partnership, a disparate group, a business, a group of individuals, or an individual.

13. A non-transitory computer readable medium having stored thereon instructions for deriving at least one influencer comprising machine executable code which when executed by at least one processor, causes the processor to perform steps comprising:
   receiving a data set comprising at least one selected topic;
   performing a first keyword search for the selected topic, using a first keyword search query in at least one published platform channel, the first keyword search query containing keywords to identify a first meta-data of the at least one selected topic;
   performing a second keyword search in at least one conversari platform channel the second keyword search query containing keywords to identify a second meta-data of the at least one selected topic;
   categorizing the first meta-data and the second meta-data based on at least one metric;
   calculating a social influence measurement score by applying a linear combination with pre-configured weightages for the at least one metric; and
   designating a first ranked entity as an influencer for the selected topic, wherein the ranking is determined based on the social influence measurement score.

14. The medium as set forth in claim 13 wherein the first meta-data is identified based on pre-configured weightage for each of a plurality of content categories.

15. The medium as set forth in claim 13 wherein the metric comprises:
   a first audience metric and a second audience metric, wherein the first audience metric is associated with the first meta-data and the second audience metric is associated with the second meta-data;
   a first authority metric and a second authority metric, wherein the first authority metric is associated with the first meta-data and the second authority metric is associated with the second meta-data; and
   a first activity metric and a second activity metric, wherein the first activity metric is associated with the first meta-data and the second activity metric is associated with the second meta-data.

16. The medium as set forth in claim 15 further comprising calculating a published engagement score by applying a linear algorithm with pre-configured weightages for each of the metrics associated with the first meta-data.

17. The medium as set forth in claim 15 further comprising calculating a conversari engagement score by applying a linear algorithm with pre-configured weightages for each of the metrics associated with the second meta-data.

18. The medium as set forth in claim 13 wherein the entity comprises at least one or more of a web entity, a partnership, a disparate group, a business, a group of individuals, or an individual.

\* \* \* \* \*